United States Patent [19]

Lin et al.

[11] Patent Number: 4,683,271
[45] Date of Patent: Jul. 28, 1987

[54] SILICONE-ESTER POWDER COATING COMPOSITIONS

[75] Inventors: Ju-Chui Lin, Strongsville; Kirk J. Abbey, Seville; Gary P. Craun, Berea; Peter V. Robinson, Medina, all of Ohio

[73] Assignee: The Glidden Company, Cleveland, Ohio

[21] Appl. No.: 869,419

[22] Filed: Jun. 2, 1986

Related U.S. Application Data

[63] Continuation-in-part of Ser. No. 745,443, Jun. 17, 1985, Pat. No. 4,608,421.

[51] Int. Cl.$^4$ ............................................. C08G 65/32
[52] U.S. Cl. .................................... 525/403; 525/440; 525/443; 525/446; 528/25; 528/26; 528/29
[58] Field of Search ............... 525/440, 446, 443, 403; 528/25, 26, 29

[56] References Cited

U.S. PATENT DOCUMENTS 4,525,535  6/1985  Craun et al. ................... 525/443
4,608,421  8/1986  Lin ..................................... 528/29

Primary Examiner—Melvyn I. Marquis
Attorney, Agent, or Firm—Thomas M. Schmitz

[57] ABSTRACT

New siloxane-esters, useful as powder coating resins, are prepared by random condensation polymerization of a hindered glycol and a hydroxy functional silicone having about two

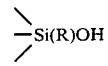

groups per molecule wherein R is lower alkyl or phenyl groups and the remaining silicone valences form ring-structured siloxanes. Improved powder properties, including tack temperatures of 150° F. to 220° F., are believed to result in part from the hindered glycols especially those having carboxylic functionality.

7 Claims, No Drawings

SILICONE-ESTER POWDER COATING COMPOSITIONS

This application is a continuation-in-part application based on copending and commonly assigned application Ser. No. 745,443 filed June 17, 1985, now U.S. Pat. No. 4,608,421, which is incorporated herein by reference.

The invention relates to high siloxane content siloxane esters and their use in powder coating and coil coating formulations.

BACKGROUND OF THE INVENTION

The closest prior art appears to be U.S. Pat. No. 4,608,421 and the references disclosed therein. U.S. Pat. No. 4,608,421 teaches hard silicone-polyester coatings having moderate to high tack temperature. The present invention relates to silicone-ester resins comprising the condensation of silanol functional silicones with hindered glycols and hindered glycols having carboxylic acid functionality. The new silicone esters, having high siloxane content, basis total resin, from about 30-90% and preferably exceeding 40%, exhibit higher tack temperatures and increased storage stability.

BACKGROUND OF THE INVENTION

U.S. Pat. No. 4,608,421 relates to high silicone content siloxane-polyester, siloxane-ether and siloxane-ether-polyester copolymers having an acid number of from about 0 to 20, an hydroxyl number from 20 to about 180 and powder coatings formulated therefrom. Briefly, such copolymer resins comprise the reaction product, totaling 100 percent of:

(a) 0 to 33 percent polyester precursor organic diacid;
(b) 20 to 30 percent multifunctional glycol or polyol having at least two hydroxy functional groups;
(c) 0 to 8 percent trimellitic acid or anhydride; and
(d) 30 to 90 percent hydroxy-functional silicone having at least two ester precursor silanol groups per mole adapted to react with said diacid and said multi-functional glycol to provide a crystalline siloxane-polyester powder coating having a tack temperature of at least 150° F.

One aspect of the U.S. Pat. No. 4,608,421 relates to the random copolymerization of the ester precursor components with cyclic siloxanes having the structure:

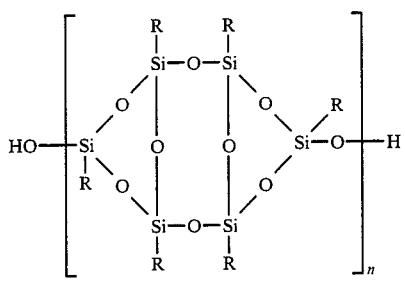

where R is independently lower alkyl or phenyl groups and n=1.

Further aspects include high siloxane copolymers and powder coatings comprising the condensation of 20 to 55 mole percent preformed hydroxyl bearing polyester with 45 to 80 mole percent of the above polysiloxane where n is 1 to 12.

A further aspect is the condensation of multifunctional glycols, preferably neopentyl glycol, with the cyclic siloxanes where n=1 to 12 and the formation of siloxane-polyether-polyester siloxane having at least 40 percent by weight siloxane which comprises the reaction product of 20-55 mole percent hydroxy functional polyester with 45-80 mole percent preformed glycol-siloxane adduct; wherein said glycol is selected from neopentyl glycol, bisphenol A, propylene glycol, 1,4-cyclohexane dimethanol, ethylene glycol, trimethylolethane, trimethylolpropane, p-hydroxyphenyl p-hydroxybenzoate and similar multihydroxy functional glycols. Also useful are the alkylene glycols having up to 12 carbon atoms, such as for example hexamethylene glycol.

A further aspect of the U.S. Pat. No. 4,608,421 relates to powder coatings and paints prepared from the above copolymers.

The siloxane-polyester and siloxane-polyether and siloxane-polyether-polyester copolymers are derived from the reaction of low molecular weight functional organic siloxanes, especially cyclosiloxanes, with one or more rigid dicarboxylic acids, trimellitic anhydride and multifunctional glycols with or without a chain brancher component. The siloxane copolymers exhibit high tack temperature >50° C. and good flow at high temperature. Such resins are hard and brittle at room temperature and can be powdered by mechanical grinding. Powder coatings formulated therefrom are especially valuable in coating metals.

Preferred copolymers are those wherein the diacid is terephthalic acid, the multifunctinal glycol is neopentyl glycol and said hydroxy functional cyclic siloxane is a methyl and/or phenyl substituted siloxane.

Preferably siloxane component is a cyclic silanol having at least about two

groups per molecule and wherein some of the non-hydroxy valence bonds of the silanol contribute to the cyclic structure. Preferred polyfunctional silicones include those set forth in U.S. Pat. No. 3,912,670 and 4,107,148, both incorporated herein by reference. The most preferred hydroxy functional silicone is Z-6018 (Dow Corning) having a molecular weight of about 600 and a theoretical formula:

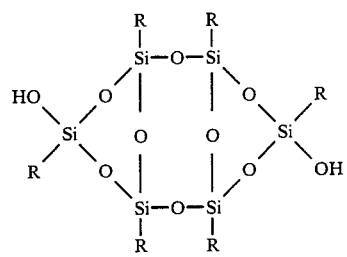

Where R is independently lower alkyl or phenyl groups and particularly methyl, ethyl, and phenyl groups.

The desired crystallinity, tack temperatures and flow properties are derived from a rigid diacid, a multifunctional glycol and hydroxy-functional cyclic siloxanes. It is believed, without being bound thereto, that the advantageous properties of the instant powder coatings result in part from a controlled linearity resulting from the use of rigid diorganic acids and the inherent structure provided by the cyclic siloxanes having terminal hydroxyl group Si(R)-OH functionality and in part from the contribution of a high silicon content. The preferred siloxane is Z-6018 and self-condensation products thereof. Such products may contain up to twelve units of the above-indicated siloxane and have molecular weights of from about 600 to about 8,000.

A variety of rigid diacids are useful in the practice of this invention. These include, for example, maleic acid, fumaric acid, terephthalic acid, isophthalic acid, adipic acid, cyclohexanedicarboxylic acid, and the like. Terephthalic and isophthalic are preferred diacids because of the crystallinity and tack temperatures of the polymer resins obtained. When a mixture of different diacids is required to achieve advantageous coating properties in the formulated powder coating paints it is preferred that a major amount of terephthalic acid be used. The rigid diacids are used in amounts of from about 0-40 percent and preferably at about 25-33 weight percent.

Referring next to the polyfunctional glycols useful in preparing the silicone-polyester and siloxane-ether resins a variety of known glycols are available for use. These include, for example, ethylene glycol, propylene glycol, glycerin, bisphenol A,. bisphenol B, neopentyl glycol, pentaerythritol, trimethylolethane, trimethylolpropane glucose, 1,4-cyclohexanedimethanol, polyvinyl alcohol, and the like. Neopentyl glycol is the preferred glycol and should be used in a major proportion when mixtures of other glycols are indicated for other purposes. When needed, small amounts of other alcohols, such as mono alcohols, can be added in minor proportion to provide particular coating properties. As indicated above, difunctional glycols are preferred because of the crystallinity obtained from rigid diacids and symmetrical glycols, believed to result from the linearity of such combinations. The glycols are used in amounts ranging from 15-35 and preferably from about 20 to 30 weight percent.

In addition to the above compounds, small amounts of trimellitic acid, up to 8 weight percent, are beneficial in providing backbone branching and hence contribute to rigidity and film hardness.

The resins hereinafter exemplified are hard and brittle at room temperature and can be powdered by mechanical grinding. Unless otherwise indicated temperatures are expressed in degrees Centrigrade and percentages are weight percentages.

EXAMPLE 1

Preparation of Silicone-Polyester

A composition comprising silicone resin Z-6018 (Dow Corning) 37.4 pphr, mixed with 29.5 pphr of neopentyl glycol (NPG), 33.2 pphr of terephthalic acid and 300 ppm of butyl stannoic acid was heated in a resin kettle with vigorous stirring and nitrogen gas purging for 24 hours at temperature below 260° C. until a clear resin was obtained. Acid number 17.3; OH% 2.5; tack temperature of the powder made from this resin is 70° C.; melt viscosity of 20 poise 200° C. and 55 poise 175° C.; % silicone: 40; GPC $\overline{MW}$ $1.44 \times 10^5$.

EXAMPLE 2

Preparation of Siloxane-Polyether

Resin 2-A: In one resin kettle, 80 pphr of Z-6018 was cooked with 20 pphr of neopentyl glycol; within 6 hours it was heated up to 235° C. and a clear transparent resin was obtained; tack temperature 57° C.; melt viscosity 10 poise 200° C.; % silicone 79.

Resin 2-B: In a separate resin kettle, 40 pphr neopentyl glycol was melted and 53.3 pphr of terephthalic acid added. The mix was cooked for 2 days at a temperature below 260° C. until it turned transparent. Then a 6.6 pphr of trimellitic anhydride were added and cooked to obtain a final acid number of 42; tack temperature 83° C.; and melt viscosity 20 poise at 200° C.

Siloxane-polyether-polyester

Resin 2-C: Equal amounts of resin 2-A and resin 2-B were cooked to final acid number of 18.84 at temperature not exceeding 230° C. for an hour. Product resin had a tack temperature at 90° C.; melt viscosity of 50 poise at 200° C.; % silicone 40.

EXAMPLE 3

Resin 2-A (63%) and resin 2-B (37%) were combined and cooked at about 220° C. for 30 minutes. The product was a clear transparent resin: acid number 15; tack temperature 87° C.; melt viscosity 20 poise at 200° C.; % silicone 50; GPC $\overline{MW}$ $1.28 \times 10^4$.

EXAMPLE 4

Two-Stage Preparation of Siloxane-Ether

Resin 4-A: In a 5-liter 4-neck round bottom flask, 70.8 parts Z-6018 were added with 29.2 parts neopentyl glycol. The mixture was cooked for 7 hours below 190° C. until a clear resin was obtained. Tack temperature of the powder made from this resin is 50 C. melt viscosity at 200° C. is 5 poise. GPC $\overline{MW}$: 2330; % silicone 71.

Resin 4-B: In a separate 5-liter 4-neck round bottom flask, 40 parts of resin 2-B (straight polyester) and 60 parts of resin 4-A were cooked to final acid number of 15.6. Product resin has a tack temperature at 64° C., melt viscosity of 8 poise at 200° C.; % silicone 44.2; GPC $\overline{MW}$: 7910.

Resin 4-B, 200 pphr: Caprolactam blocked isophorone diisocyanate, (blocked IPDI crosslinker) 63 pphr; titanium dioxide 133.5 pphr, and Resiflow P (SBS Chemicals), 2.1 pphr were blended, extruded, ground, and sieved to less than 100 mesh. The white powder was coated over Bonderite 1000 cold rolled steel (Baker Chemicals Company) and then baked at 200° C. for 20 minutes. The resulting coating is 2.4 to 4.0 mils thick; with 3H pencil hardness, 40 lb-in. direct impact. 100 double MEK rubs passed; 86% 60 degree specular gloss, 49% 20-degree gloss, and 94% 85 degree gloss, initially; after 630 hours QUV exposure: 51% 60 degree gloss, 8% 20 degree gloss and 92% 85 degree gloss.

EXAMPLE 5

High Gloss Powder Coating

One-Step Cook Using Isophthalic Acid

In a 5-liter 4-neck round bottom flask, 27.5 parts of neopentyl glycol, 23 parts of isophthalic acid were mixed and heated below 240° C. with stirring and nitrogen purging. Silicone intermediate Z-6018, 49.5 parts were added in fractions during the 4-days cook. The resin turns clear during the first day of reaction; at the end of cooking, 318 gms. of water was collected. The resulting resin has a tack temperature of 57.3° C.; melt viscosity 10 poises at 175° C.; acid number 7.8; and % silicone 47 and GPC $\overline{MW}$ is 6210.

This resin, 100 pphr, was blended with Blocked IPDI crosslinker, 48 pphr; titanium dioxide 121 pphr and Resiflow P, 1.9 pphr by extrusion. The powder was sprayed on Bonderite 1000 and baked 30 minutes at 200° C. to give a coating of 1.6 to 2.2 mils thick. The coating passed 100 MEK double rubs; H pencil hardness; 35 lb-in. direct impact, and 88% on 60-degree gloss, 74% on 20-degree gloss and 98% on 85 degree gloss, initial readings; after 630 hours QUV exposure: 82% 60 degree gloss, 50% 20 degree gloss and 99% 85 degree gloss.

EXAMPLE 6

Low Gloss Powder Coating

One-Step Silicone-Ether/Polyester Blend

In a 5-liter 4-neck round bottom flask, 87.2 parts of Z-6018 were heated to less than 210° C. for 2 hours, 33 ml. of water were collected. Then the temperature was lowered to 170° C. and 12.8 parts of neopentyl glycol were added slowly. The mixture was cooked below 220° C. for another 2.5 hours until 74 ml. of water was collected. The resin tack temperature is 80° C., melt viscosity at 200° C. is 18 poises, % silicone 88.3, and GPC $\overline{MW}$ is 5690.

This resin, 56.8 pphr and 43.2 pphr commercial polyester (Goodyear VPE5802; acid number 15) was blended with blocked IPDI crosslinker, 29 pphr; Resiflow P, 1.65 pphr and titanium dioxide 105.5 pphr by extrusion. The powder was sprayed on Bonderite 1000 and baked at 200° C. for 20 minutes to give a coating of 2.4 to 4.0 mils thick. The film passed 100 MEK double rubs; 3H pencil hardness; 140 lb-in. direct and reverse impact; 45% on 60-degree gloss; 8.7% on 20-degree gloss and 55% on 85-degree gloss, initial readings; after 630 hours QUV exposure: 38.4% 60 degree gloss, 5.7% 20 degree gloss and 54% 85 degree gloss.

EXAMPLE 7

Low Gloss Powder Coating

The resin of Example 6 (100 pphr) was blended and extruded with 27 pphr blocked IPDI crosslinker, 0.9 pphr of Resiflow P and 104.7 pphr titanium dioxide. The powder was sprayed on Bonderite 100 CRS and baked at 200° C. for 20 minutes and 180° C. for another 19 hours: 25 lb-inch direct impact, 6.2% 60 degree gloss, 1% 20 degree gloss and 93% 85 degree gloss.

EXAMPLE 8

Terephthalic acid, 21.9 parts; neopentyl glycol 30 parts, and 125 ppm of butyl stannoic acid were heated to less than 210° C. for 7.5 hrs. and kept at 160° C. overnight, then heated to less than 250° C. for 6.5 hrs. about 550 ml of water was collected. Then 0.47 part of TMA was added, and the reaction was continued at around 230° C. for 1.5 hrs. and cooled to 160° C. for overnight. Then 47.62 parts of Z-6018 were added slowly in several fractions below 220° C. until approximately 760 ml. of water were collected. The resin has the following properties: acid number 11.5; tack temperature 52.5; melt viscosity 4 poises (175° C.), GPC $\overline{MW}$ 2960.

100 pphr of the resin was blended and extruded with 48 pphr of blocked IPDI crosslinker, 1.9 pphr Resiflow and 121 pphr titanium dioxide. The powder was then sprayed on Bonderite 1000 CRS and baked at 200° C. for 20 minutes and 180° C. for another 19 hours: 100 MEK rubs, 15 lb-inch direct impact; 84% 60 degree gloss, 46.5% 20 degree gloss and 92% 85 degree gloss.

EXAMPLE 9

In a 5-liter 4-neck round bottom flask, 73.2 parts of Z-6018 were heated to below 220° C. for 2 hrs. until 29 ml. of water were collected. Then 6 parts of isophthalic acid were added and 20.8 parts of neopentyl glycol were added in fractions within 24 hours. The batch was controlled under 230° C. with nitrogen purging and stirring until an acid number of 12 was reached. The resin is clear, has a tack temperature of 74° C. and melt viscosity is 40 poises at 200° C.; silicon 73. GPC $\overline{MW}$ is 34,500.

EXAMPLES 10-12

Example 10 shows a siloxane-ether using bisphenol A as the multifunctional hydroxyl component (i.e. glycol) and a minor amount of diacid (IPA). Example 11 is a variant of Example 2-A—a silicone-ether with acid number and n=1. Example 12 is a variant of Example 6, a siloxane-ether where the siloxane is a condensed siloxane unit and n is greater than 2.

TABLE I

| EXAMPLE NO. | 1 | 2-A | 2-B | 3 | 10 | 11 |
|---|---|---|---|---|---|---|
| mole Si—OH | 1.1 | 1.9 | 0 | 170 g Resin 2-A | 2.0 | 8.0 |
| mole C—OH | 4.2 | 2.4 | 18 | — | 2.8 | 16.0 |
| mole COOH | 3.0 | 0 | 16.9 | 100 g Resin 2-B | 0.6 | 0 |
| C—OH type | NPG | NPG | NPG | NPG; PG; TME | BPA | NPG |
| COOH type | TPA | — | TPA; TMA | TPA | IPA | — |
| acid number | 17.3 | 22 | 49 | 15 | — | 0 |
| Hydroxyl Number | 83 | 53 | 66 | 53 | — | 155 |
| $\dfrac{\text{COOH} + \text{SiOH}}{\text{COH}}$ | 0.97 | 0.78 | 0.94 | 0.84 | 0.93 | 0.5 |
| $\overline{Mn}$ | 2310 | 1780 | 2360 | 2240 | — | 900 |
| $\overline{Mw}$ | 144000 | 7310 | 5780 | 12800 | — | 2330 |
| $\overline{Mw}/\overline{Mn}$ | 62.5 | 4.10 | 2.45 | 5.72 | — | 2.59 |
| Tack Temp. (°C.) | 70.2 | 56.7 | 82.8 | 87.3 | 82.1 | 50.0 |
| ICI C&P Viscosity (Poise)** | 20 | 10 | 20 | 20 | 30 | 5 |
| Silicone % (Wt.) | 40 | 79 | 0 | 50 | 60 | 71 |

TABLE I-continued

| EXAMPLE NO. | 1 | 2-A | 2-B | 3 | 10 | 11 |
|---|---|---|---|---|---|---|
| Comment | BSA Catalyzed | — | BSA Catalyzed | — | — | *** |

NPG: neopentyl glycol; TMA: trimellitic anhydride; TPA: terephthalic acid; IPA: isophthalic acid; BPA: bisphenol A; PG: propylene glycol; TME: trimethylolethane; BSA: butyl stannoic acid.
*Copolymerizing 1 kg polyester 2-B with 1.5 kg resin
**Measured at 175° C.
***Extruded with VPE 5802

TABLE II

| EXAMPLE NO. | 4 | 5 | 6,7 | 8 | 9 | 12 |
|---|---|---|---|---|---|---|
| mole Si—OH | * | 7.2 | 8 | 15 | 8 | 8 |
| mole C—OH | * | 20.2 | 6 | 48.5 | 11 | 12 |
| mole COOH | * | 10.6 | 0 | 28.8 | 2 | 0 |
| C—OH type | NPG | NPG | NPG | NPG | NPG | NPG |
| COOH type | TPA; TMA | IPA | — | TPA; TMA | IPA; TMA | — |
| acid number | 15.7 | 7.8 | 0 | 11.5 | 12 | 0 |
| Hydroxyl Number | 116 | 90 | 73 | 90 | 50 | 50 |
| $\frac{COOH + SiOH}{COH}$ | 0.67 | 0.88 | 1.33 | 0.90 | 0.91 | 0.67 |
| $\overline{Mn}$ | 833 | 623 | 1540 | 554 | 5530 | 1250 |
| $\overline{Mw}$ | 7910 | 6214 | 5690 | 2960 | 34500 | 8910 |
| $\overline{Mw}/\overline{Mn}$ | 9.49 | 9.98 | 3.70 | 5.35 | 62.5 | 7.14 |
| Tack Temp. (°C.) | 64 | 57.3 | 80 | 52.5 | 74 | 59.3 |
| ICI C&P Viscosity (Poise)** | 12 | 10 | 40 | 4 | 40 | 31.5 |
| Silicone % (Wt.) | 44.2 | 47.3 | 88.3 | 47.3 | 73 | 77 |

NPG: neopentyl glycol; CHDM: cyclohexanedimethanol; TMA: trimellitic anhydride; TPA: terephthalic acid; IPA: isophthalic acid. BPA: bisphenol A; PG: propylene glycol; TME: trimethylolethane; BSA: butyl stannoic acid.
**Measured at 200° C.
*Copolymerizing 1 Hg polyester 2-B with 1.5 Hg resin.

DETAILED DESCRIPTION OF THE INVENTION

Siloxane-Esters

This invention relates to high silicone content siloxane-ester copolymers having an acid number of from about 5 to 65, an hydroxyl number from 5 to about 225, and a tack-temperature of 150° F. to 220° F. and powder coatings formulated therefrom. Briefly, such copolymer resins comprise the reaction, totaling 100 percent of:

(a) 10 to 40 weight percent hindered glycol comprising a mixture of (1) a sterically protected glycol having the structure

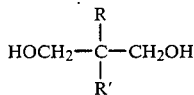

wherein R is selected from the group consisting of hydrogen, lower alkyl, methylol and ethylol radicals; R' is a lower alkyl, methylol and ethylol radical and (2) a multifunctional glycol acid having the structure

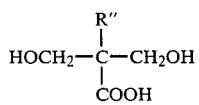

wherein R" is selected from the group consisting of hydrogen, lower alkyl, methylol and carboxylic acid radicals;

wherein said glycol acid comprises 5 to 45% preferably 10 to 30% of the total hindered glycol; and (b) 60 to 90 weight percent hydroxy-functional silicone having at least two ester precursor silanol groups adapted to react with said hindered glycol to provide a storage stable siloxane-ester powder coating having a tack temperature of at least 150° F., said siloxane having the structure:

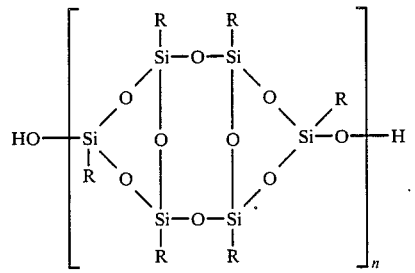

where R is independently lower alkyl or phenyl groups and n=1.

Further aspects include high siloxane copolymers and powder coatings comprising the condensation of 20 to 55 mole percent preformed hydroxyl bearing polyester or polyacrylate with 45 to 80 mole percent of the above-described siloxane ester. Useful sterically protected glycols include neopentyl glycol, bisphenol A, 1,4-cyclohexane dimethanol, trimethylolethane, and trimethylolpropane. Although neopentyl glycol is preferred because of its rigidity, lesser amounts of other glycols may be used. Less hindered glycols or alcohols may be added in minor proportion for the development of specific film properties.

Useful multifunctional glycol acid monomers include for example dimethylol propionic acid, dimethylol butyric acid, dimethylol pentanoic acid, and dimethylol phenyl acetic acid.

The instant siloxane-ester, preferably prepared using Z-6018 cyclic siloxane, neopentyl glycol, and dimethylol propionic acid are useful as resins for powder and high solids coating. The siloxane-ester may be used alone or blended with from about 0 to about 99 weight percent, basis siloxane-ester, of a hydroxy functional resin and a crosslinking agent such as for example glycolurils, blocked isocyanates, and melamine-type crosslinking agents. Such hydroxy functional resins will have number average molecular weights ranging from about 1,000 to about 20,000 and hydroxyl number of from about 30 to about 70. Preferred resins include polyester and polyacrylate resins. Preferred crosslinking agents are the glycoluril such as tetramethoxymethylol glycoluril (TMMM) and blocked isocyanates.

The following examples illustrate the preparation of the new siloxane-esters and their use in coatings and powder coatings used either alone or as blends with other hydroxyl functional resins including but limited to polyesters and polyacrylates.

The terms "siloxane-ester" and "siloxane ether" are used interchangeably to designate a reaction product of a hydroxyl bearing siloxane, preferably multifunctional hydroxyl, with one or more multifunctional organic compounds having hydroxyl functional groups. The reaction is a condensation reaction with the evolution of water and the formation of multiple Si—O—C linkages. The products of the invention can be depicted as having the structure:

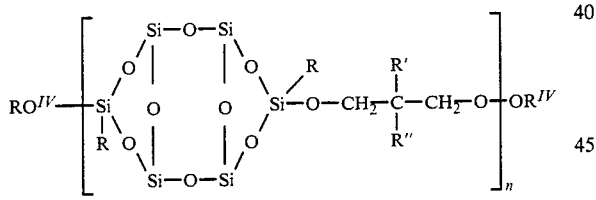

wherein n is an integer from 1 to 25; wherein R is independently methyl or phenyl radicals; R' is hydrogen, lower alkyl, lower alkanol; R" is independently lower alkyl, lower alkynol or carboxylic acid; R$^{IV}$ is hydrogen or the residue from a hydroxyl bearing resin such as polystyrene or polyacrylate.

EXAMPLE 13

Silicone/Glycol/Glycol Acid Adducts

In a 5-liter, 4-neck, round-bottom flask, 1590 grams of Z-6018 silicone intermediate was mixed with 345 grams neopentyl glycol and 201 grams dimethylol propionic acid. The batch was heated to 135° C. to obtain a white milky solution. Within 2 hours, the temperature was raised to 185° C. and 72 grams of water was expelled from the batch. The product resin was white, acid number 38.6, tack-temperature 184.6° F. (84.7° C.), yield 1885 grams, ICI cone and plate viscosity 20 poise at 175° C. using a 40-poise cone; theoretical hydroxyl number was 125.

EXAMPLE 14

Ten grams of the resin from Example 1 was mixed with 5.5 grams caprolactum-blocked IPDI crosslinker and 55 grams MEK.

A clear solution was obtained immediately. A thin film with thickness of 0.4~0.8 mil was drawn down on Bonderite 1000 CRF (iron phosphate treated), baked at 360° C. for 20 minutes.

The coating gave the following properties:

| | |
|---|---|
| 60° Gloss | 94.5% |
| 20° Gloss | 70.2% |
| Pencil Hardness | 2H |
| 100 MEK Double Rubs | Passed |
| Direct Impact (lb.-in.) | 160 |
| Reverse Impact (lb.-in.) | 30 |

Good flexibility and adhesion also shown by conical mandrel test.

What is claimed is:

1. A siloxane ester having an acid number of from about 5 to 65, a hydroxyl number from about 5 to 225, and a tack-temperature of from about 150° F. to 220° F. comprising the reaction product, totaling 100% of:

(a) 10 to 40 weight percent hindered glycol comprising a mixture of (1) a sterically protected glycol selected from the group consisting of 1,4-cyclohexane dimethanol and a glycol having the structure

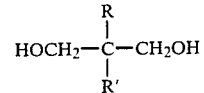

wherein R is selected from hydrogen, lower alkyl, mthylol or ethylol radicals; and R' is lower alkyl, methylol or ethylol radical; and (2) a multifunctional glycol acid having the structure

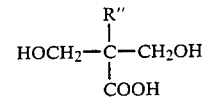

wherein R" is hydrogen, lower alkyl, methylol or carboxylic acid radicals; and wherein said glycol acid comprises 5–45 weight percent of said hindered glycol; and (b) 60 to 90 weight percent hydroxy functional silicone having at least two ester precursor silanol groups adapted to react with said hindered glycol to provide a storage stable siloxane ester powder coating having a tack-temperature of at least 150° F., said siloxane having the structure:

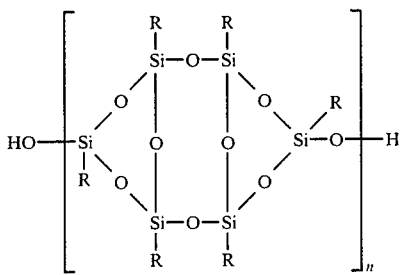

wherein n is an integer from 1 to 10 and R independently represents lower alyl or phenyl groups.

2. The siloxane-ester of claim 1 wherein the sterically protected glycol is neopentyl glycol; and the glycol acid is dimethylol propionic acid.

3. The siloxane-ester of claim 1 wherein the sterically protected glycol comprises 8 to 24 weight percent neopentyl glycol and said glycol acid comprises 3 to 14 weight percent dimethylol propionic acid; and said siloxane-ester has an acid number of from about 5 to 40, a hydroxyl number of about 5 to about 200; and a tack temperature of at least 150° F.

4. A powder coating which comprises the siloxane ester of claims 1, 2, or 3.

5. A coating which comprises a blend comprising a major weight portion of the siloxane-ester of claim 1 with a minor weight portion of a hydroxy functional resin having a number average molecular weight from about 1,000 to about 20,000; and a crosslinking agent adapted to crosslink with the blend of resin and siloxane ester; wherein said hydroxy functional resin is selected from the group consisting of a polyester and acrylic resin.

6. The coating of claim 5 wherein the resin is a hydroxy functional polyester and the crosslinking agent is a blocked isocyanate.

7. The coating of claim 5 wherein the resin is a hydroxy functional acrylate resin and the crosslinking agent is a glycoluril crosslinker.

* * * * *